US010671156B2

United States Patent
Wu et al.

(10) Patent No.: US 10,671,156 B2
(45) Date of Patent: Jun. 2, 2020

(54) ELECTRONIC APPARATUS OPERATED BY HEAD MOVEMENT AND OPERATION METHOD THEREOF

(71) Applicant: Acer Incorporated, New Taipei (TW)

(72) Inventors: Cheng-Tse Wu, New Taipei (TW); An-Cheng Lee, New Taipei (TW); Sheng-Lin Chiu, New Taipei (TW); Ying-Shih Hung, New Taipei (TW)

(73) Assignee: Acer Incorporated, New Taipei (TW)

( * ) Notice: Subject to any disclaimer, the term of this patent is extended or adjusted under 35 U.S.C. 154(b) by 98 days.

(21) Appl. No.: 16/150,274

(22) Filed: Oct. 3, 2018

(65) Prior Publication Data

US 2020/0050263 A1    Feb. 13, 2020

(30) Foreign Application Priority Data

Aug. 9, 2018 (TW) ............. 107127782 A

(51) Int. Cl.
  *G06F 3/01*     (2006.01)
  *G06F 17/17*    (2006.01)
  *G06K 9/00*     (2006.01)

(52) U.S. Cl.
  CPC .............. *G06F 3/012* (2013.01); *G06F 3/013* (2013.01); *G06F 17/17* (2013.01); *G06K 9/00248* (2013.01)

(58) Field of Classification Search
  CPC .......... G06F 3/012; G06F 3/013; G06F 17/17; G06F 3/0304; G06K 9/00248
  See application file for complete search history.

(56) References Cited

U.S. PATENT DOCUMENTS 7,742,623 B1    6/2010  Moon et al.
8,594,374 B1 *  11/2013 Bozarth .................. G06F 21/36
                                                        382/103

(Continued)

FOREIGN PATENT DOCUMENTS

CN          1606029         4/2005
TW          201715342       5/2017

(Continued)

OTHER PUBLICATIONS

Roberto Valenti et al., "Combining Head Pose and Eye Location Information for Gaze Estimation," IEEE Transactions on Image Processing, vol. 21, No. 2, Feb. 2012, pp. 802-815.

*Primary Examiner* — Nitin Patel
*Assistant Examiner* — Amy Onyekaba
(74) *Attorney, Agent, or Firm* — JCIPRNET

(57) ABSTRACT

An electronic apparatus including an image capturing device, a storage device and a processor and an operation method thereof are provided. The image capturing device captures an image for a user, and the storage device records a plurality of modules. The processor is coupled to the image capturing device and the storage device and is configured to: configure the image capturing device to capture a head image of a user; perform a face recognition operation to obtain a face region; detect a plurality of facial landmarks within the face region; estimate a head posture angle of the user according to the facial landmarks; calculate a gaze position where the user gazes on the screen according to the head posture angle, a plurality of rotation reference angle, and a plurality of predetermined calibration positions; and configure the screen to display a corresponding visual effect according to the gaze position.

16 Claims, 6 Drawing Sheets

(56) References Cited

U.S. PATENT DOCUMENTS

| | | | |
|---|---|---|---|
| 8,854,433 B1* | 10/2014 | Rafii | G06F 3/017 348/42 |
| 8,885,882 B1* | 11/2014 | Yin | G06F 3/00 382/103 |
| 9,185,352 B1* | 11/2015 | Jacques | H04N 7/18 |
| 9,442,564 B1* | 9/2016 | Dillon | G06F 3/012 |
| 9,606,623 B2* | 3/2017 | Seok | G06K 9/00597 |
| 9,798,383 B2* | 10/2017 | Horesh | G06F 3/013 |
| 9,832,452 B1* | 11/2017 | Fotland | H04N 13/20 |
| 10,061,383 B1* | 8/2018 | Ludusan | G06F 3/013 |
| 10,379,612 B1* | 8/2019 | Bonnier | G06F 3/0304 |
| 2009/0179853 A1* | 7/2009 | Beale | A61F 4/00 345/156 |
| 2010/0328444 A1* | 12/2010 | Blixt | A61B 3/113 348/78 |
| 2011/0069277 A1* | 3/2011 | Blixt | A61B 3/113 351/210 |
| 2011/0085139 A1* | 4/2011 | Blixt | A61B 3/113 351/209 |
| 2012/0256820 A1 | 10/2012 | Uppuluri et al. | |
| 2012/0294478 A1* | 11/2012 | Publicover | G02B 27/0093 382/103 |
| 2014/0049452 A1* | 2/2014 | Maltz | G06F 3/013 345/8 |
| 2014/0055747 A1* | 2/2014 | Nistico | A61B 3/14 351/206 |
| 2014/0160005 A1* | 6/2014 | Lee | G06F 3/017 345/156 |
| 2014/0204193 A1* | 7/2014 | Zhang | G06K 9/00597 348/78 |
| 2014/0211995 A1* | 7/2014 | Model | G06F 3/013 382/103 |
| 2014/0313124 A1* | 10/2014 | Kim | G06F 3/013 345/156 |
| 2014/0320397 A1* | 10/2014 | Hennessey | A61B 3/113 345/156 |
| 2014/0354539 A1* | 12/2014 | Skogo | G06F 3/0304 345/156 |
| 2015/0085251 A1* | 3/2015 | Larsen | G06K 9/00604 351/206 |
| 2015/0128075 A1* | 5/2015 | Kempinski | G06F 3/012 715/765 |
| 2015/0130714 A1* | 5/2015 | Onuki | G06K 9/00597 345/157 |
| 2015/0293588 A1* | 10/2015 | Strupczewski | G06T 17/10 382/117 |
| 2015/0316981 A1* | 11/2015 | Sellen | G06K 9/0061 345/156 |
| 2015/0348269 A1* | 12/2015 | Dedhia | G06K 9/00268 382/197 |
| 2016/0029883 A1* | 2/2016 | Cox | G06F 3/013 351/209 |
| 2016/0063303 A1* | 3/2016 | Cheung | A61B 3/113 382/103 |
| 2016/0063319 A1* | 3/2016 | Lee | G06T 7/73 382/103 |
| 2016/0092743 A1* | 3/2016 | Lee | G02B 27/0093 348/78 |
| 2016/0202756 A1* | 7/2016 | Wu | G06F 3/013 382/103 |
| 2016/0216761 A1* | 7/2016 | Klingstrom | G06F 3/013 |
| 2016/0335483 A1* | 11/2016 | Pfursich | G06K 9/00268 |
| 2017/0119298 A1* | 5/2017 | Cheung | G06F 3/013 |
| 2017/0235363 A1* | 8/2017 | Breisinger | G06F 3/013 345/156 |
| 2017/0285741 A1* | 10/2017 | Park | G06T 7/80 |
| 2017/0287446 A1* | 10/2017 | Young | G09G 5/391 |
| 2017/0340205 A1* | 11/2017 | Liu | A61B 3/032 |
| 2017/0344111 A1* | 11/2017 | Kim | G06F 3/013 |
| 2017/0344112 A1* | 11/2017 | Wilson | G06K 9/00 |
| 2017/0351327 A1* | 12/2017 | Yasuda | G06F 3/012 |
| 2017/0364149 A1* | 12/2017 | Lu | A61B 3/113 |
| 2018/0005395 A1* | 1/2018 | D'Angelo | G06T 1/0007 |
| 2018/0024632 A1* | 1/2018 | Lo | G06F 3/0482 345/156 |
| 2018/0024633 A1* | 1/2018 | Lo | G06F 3/0482 345/156 |
| 2018/0032825 A1* | 2/2018 | Fung | G06K 9/00302 |
| 2018/0074581 A1* | 3/2018 | Melman | G06F 3/013 |
| 2018/0129279 A1* | 5/2018 | Melman | G06F 3/0325 |
| 2018/0210546 A1* | 7/2018 | Rawlinson | G06K 9/00604 |
| 2018/0357790 A1* | 12/2018 | Kojima | G06T 7/75 |
| 2019/0156574 A1* | 5/2019 | Fu | G06K 9/3233 |
| 2019/0278094 A1* | 9/2019 | Huang | G06F 3/013 |

FOREIGN PATENT DOCUMENTS

| | | |
|---|---|---|
| TW | 201716827 | 5/2017 |
| WO | 2018144537 | 8/2018 |

* cited by examiner

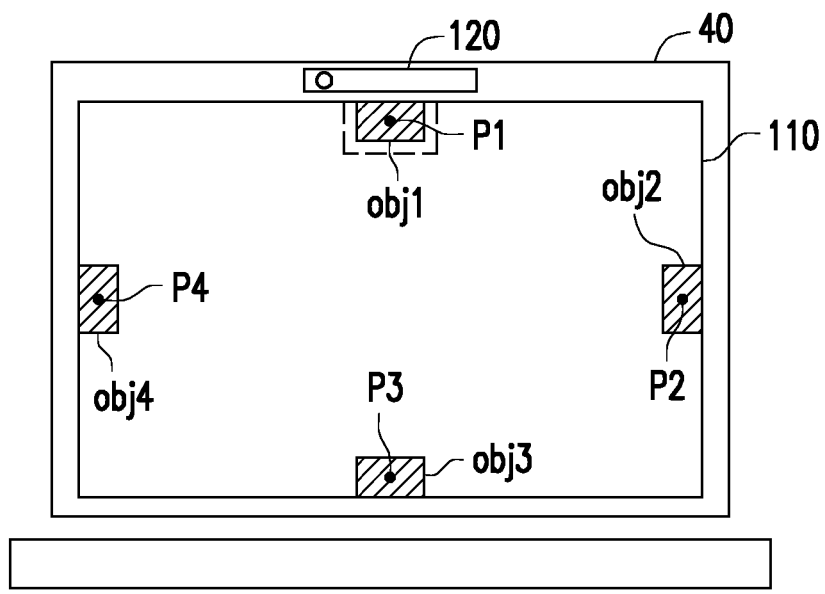
FIG. 5A
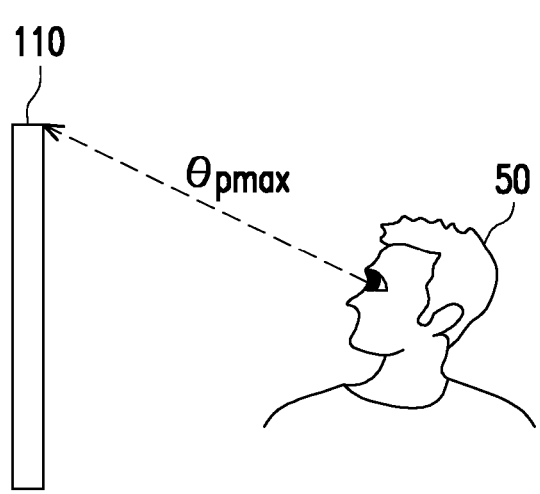 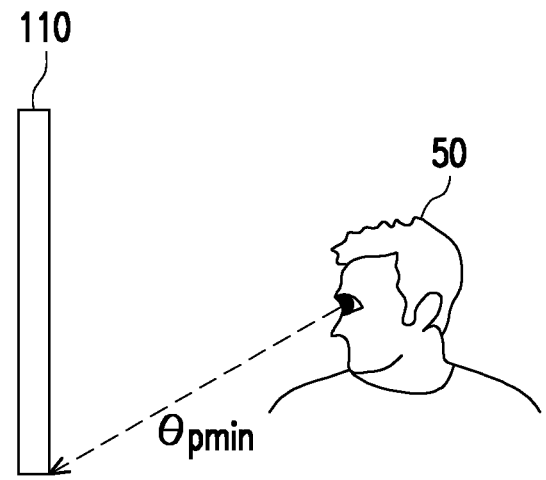
FIG. 5B          FIG. 5C

ELECTRONIC APPARATUS OPERATED BY HEAD MOVEMENT AND OPERATION METHOD THEREOF

CROSS-REFERENCE TO RELATED APPLICATION

This application claims the priority benefit of Taiwan application serial no. 107127782, filed on Aug. 9, 2018. The entirety of the above-mentioned patent application is hereby incorporated by reference herein and made a part of this specification.

BACKGROUND OF THE DISCLOSURE

Field of the Disclosure

The disclosure relates to an electronic device, and more particularly to an electronic device that can be operated by head movement and an operating method.

Description of Related Art

With the advancement of technology, users of electronic devices are constantly seeking more convenient ways for operation. For example, brain waves, eyeball tracking, head movement tracking, and body movements can be used to match or replace conventional keyboards and mouse in order to operate electronic devices more easily. Taking eyeball tracking technology as an example, such technology has been commonly applied to consumer products such as computers, mobile phones, head-mounted display devices, automobiles, game consoles and so on. The basic principle of the eyeball tracking technology is to use infrared light beam to irradiate the user's eyeballs, and then a sensor captures the light reflected from different parts such as the pupil, the iris, and the cornea, and a complicated algorithm is performed to analyze the position gazed by the user. In other words, for the current eyeball tracking and sight predicting technology, not only a typical image capturing device such as a webcam is required, an additional infrared emitter and a corresponding infrared sensor are required to achieve the purpose of tracking eyeball. In addition, the effect of eyeball tracking technology is also easily affected by the size of smaller eyeballs, or the eyeball is blocked by objects such as the nose or glasses etc.

Further, in the case of head movement tracking or body tracking technology, typically an image capturing device such as a webcam is used to track the user's nose or finger to analyze the input signal of the user. However, in circumstances such as virtual reality or medical assistance, users may wear items such as virtual reality glasses, surgical loupes, or masks, causing errors in tracking or even failure in detection. For example, mouse-replacement software Enable Viacam (http://eviacam.crea-si.com) detects movement of nose on face to correspondingly control the movement of the mouse cursor on the display screen. Similarly, another software, Camera Mouse (http://cameramouse.org), also provides an alternative to control a mouse cursor and similarly detects the movement of a single part (e.g., nose, eyes, lips, or fingers) to control the movement of the mouse cursor. Since the position of nose is more noticeable on the face, it is less affected by background or light when detected. Therefore, in the existing solutions, the swing of the nose is often used as an alternative to control the cursor of the mouse. However, there is still much room for improvement in detecting the face or the nose to control the accuracy of the electronic device and the corresponding maneuverability.

SUMMARY OF THE DISCLOSURE

In view of the above, the disclosure provides an electronic device and an operation method, capable of estimating a gaze position of a user watching a screen by using an image captured by a typical camera, so that the user can control the electronic device by the movement of head.

An electronic device is configured to make a screen display a plurality of image frames, wherein including an image capturing device, a storage device, and a processor. The storage device stores a plurality of modules. The processor is coupled to the image capturing device and the storage device, and is configured to execute the module in the storage device to perform the following steps: configuring the screen to display a plurality of marker objects at a plurality of predetermined calibration positions; configuring the image capturing device to capture a plurality of first head images when the user looks at the predetermined calibration positions; performing a plurality of first face recognition operations on the first head images to obtain a plurality of first face regions corresponding to the predetermined calibration positions; detecting a plurality of first facial landmarks corresponding to the first face regions; calculating a plurality of rotation reference angles of the predetermined calibration positions gazed by the user according to the first facial landmarks; configuring the image capturing device to capture a second head image of the user; performing a second face recognition operation on the second head image to obtain a second face region; detecting a plurality of second facial landmarks with the second face region; estimating a head posture angle of the user according to the second facial landmarks; calculating a position where the user gazes on the screen according to the head posture angle, the rotation reference angles, and the predetermined calibration positions; and configuring the screen to display a corresponding visual effect according to the gaze position.

An operation method is adapted for an electronic device including an image capturing device and making a screen to display a plurality of image frames, the method comprising: configuring a screen to display a plurality of marker objects at a plurality of predetermined calibration positions; configuring the image capturing device to capture a plurality of first head images when the user looks at the predetermined calibration positions; performing a plurality of first face recognition operations on the first head images to obtain a plurality of first face regions corresponding to the predetermined calibration positions; detecting a plurality of first facial landmarks corresponding to the first face regions; calculating a plurality of rotation reference angles of the predetermined calibration positions gazed by the user according to the first facial landmarks; configuring the image capturing device to capture a second head image of the user; performing a second face recognition operation on the second head image to obtain a second face region; detecting a plurality of second facial landmarks with the second face region; estimating a head posture angle of the user according to the second facial landmarks; calculating a position where the user gazes on the screen according to the head posture angle, the rotation reference angles, and the predetermined calibration positions; and configuring the screen to display a corresponding visual effect according to the gaze position.

Based on the above, the electronic device of the embodiment of the disclosure may not need to be equipped with an additional device such as an infrared emitter and an infrared sensor but only utilizes a typical camera to capture a user's head image, and then perform face recognition and facial landmark detection on the captured image. Thereafter, the electronic device may estimate the head posture angle of the user according to the facial landmarks generated by the facial landmark detection, and infer the position where the user gazes on the screen according to the user's head posture angle, thereby allowing the user to interact with the electronic device based on the gaze position.

In order to make the aforementioned features and advantages of the disclosure more comprehensible, embodiments accompanying figures are described in detail below.

BRIEF DESCRIPTION OF THE DRAWINGS

FIG. 5A is a schematic diagram showing an example of displaying a plurality of marker objects according to an embodiment of the disclosure.

FIG. 5B and FIG. 5C are schematic diagrams showing a situation where a user views the marker object according to the example of FIG. 5A.

DESCRIPTION OF EMBODIMENTS

Figure 1:
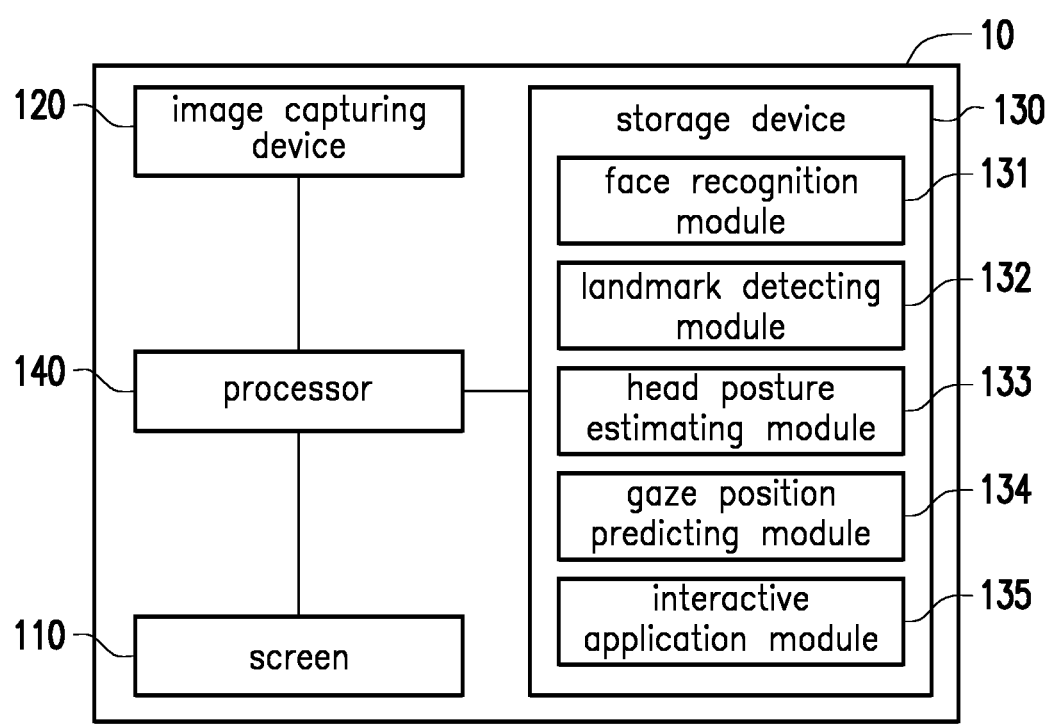
FIG. 1 is a block diagram of an electronic device according to an embodiment of the disclosure.

FIG. 1 is a block diagram of an electronic device according to an embodiment of the disclosure, which is only for convenience of description and not intended to limit the scope of the disclosure. Referring to FIG. 1, an electronic device 10 includes a screen 110, an image capturing device 120, a storage device 130, and a processor 140. The screen 110, the image capturing device 120, the storage device 130, and the processor 140 may be integrated or respectively disposed on different devices according to different design considerations. In an embodiment, the electronic device 10 may be a notebook computer, a tablet PC, or a smart TV integrated with the screen 110 and the image capturing device 120. In another embodiment, the electronic device 10 may be a desktop computer, a set-top box, or a game console. The storage device 130 and the processor 140 are disposed on the same body, and the screen 110 and the image capturing device 120 are implemented by using different devices and connected to the storage device 130 and the processor 140 in a wired or wireless manner.

The screen 110 is used to display a plurality of image frames, which may be a liquid-crystal display (LCD), a plasma display, a vacuum fluorescent display, a light-emitting diode (LED) display, a field emission display (FED), a head mounted display, and/or other suitable types of displays, the disclosure is not limited thereto.

The image capturing device 120 provides an image capturing function and includes an imaging lens having a lens and a photosensitive element. The photosensitive element is used to sense the intensity of light entering the lens to produce an image. The photosensitive element may be a charge coupled device (CCD), a complementary metal-oxide semiconductor (CMOS) element, or other elements. For example, the image capturing device 120 may be an external network camera or an embedded webcam disposed inside a mobile phone, a tablet PC, or a notebook computer. In the embodiment, the image capturing device 120 is configured to capture images within a visible light range (for example, visible light having a wavelength between 390 nm and 700 nm), and does not have the function of capturing images in the infrared-ray range (for example, a wavelength of 750 nm or more).

The storage device 130 is configured to store images, program codes, and the like. The storage device 130 may be any type of fixed or movable random access memory (RAM), a read-only memory (ROM), a flash memory, a hard drive or other similar devices, an integrated circuit, and combinations thereof. In this embodiment, the storage device 130 is configured to record a plurality of modules, and the modules may include a face recognition module 131, a landmark detecting module 132, a head posture estimating module 133, a gaze position predicting module 134 and an interactive application module 135.

The processor 140 may be a central processing unit (CPU), or other programmable general-purpose or specific-purpose microprocessor, a digital signal processor (DSP), a programmable controller, application specific integrated circuits (ASICs), a programmable logic device (PLD), or the like, or a combination of the above devices, which is connected to the screen 110, the image capturing device 120 and the storage device 130.

In the embodiment, the module stored in the storage device 130 may be a computer program, and may be loaded by the processor 140 to perform the operation method of the electronic device in the embodiment of the disclosure.

Figure 2A:
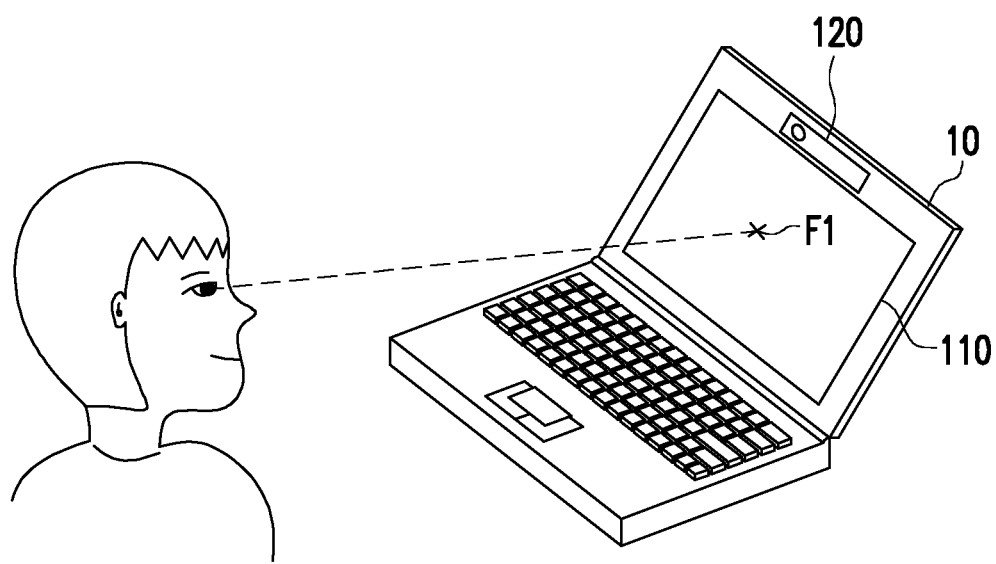
FIG. 2A is a schematic diagram of a situation of controlling an electronic device according to an embodiment of the disclosure.
Figure 2B:
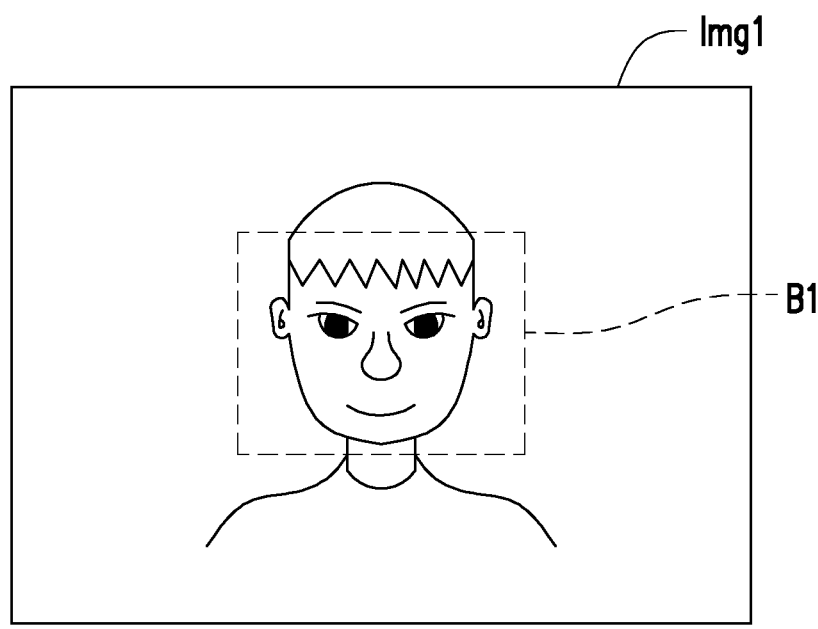
FIG. 2B is a schematic diagram showing an example of an image captured by an electronic device according to an embodiment of the disclosure.

FIG. 2A is a schematic diagram of a situation of controlling an electronic device according to an embodiment of the disclosure. FIG. 2B is a schematic diagram showing an example of an image captured by an electronic device according to an embodiment of the disclosure. Referring to FIG. 2A and FIG. 2B, when a user 20 uses the electronic device 10 (which is exemplified as a notebook computer), the image capturing device 120 captures an image Img1 for the user 20. The electronic device 10 may analyze the head posture angle of the user 20 according to the face information carried in a face region B1 in Img1, and predict a gaze position F1 on the screen 110 where the sight of the user 20 is projected according to the head posture angle of the user 20. In this manner, the electronic device 10 can interact with the user according to the gaze position F1 and the operation interface displayed by the screen 110 in real time. In other words, when the user 20 uses the electronic device 10, the user 20 may control the electronic device 10 according to the movement of head naturally generated when watching the screen 110.

Figure 3:
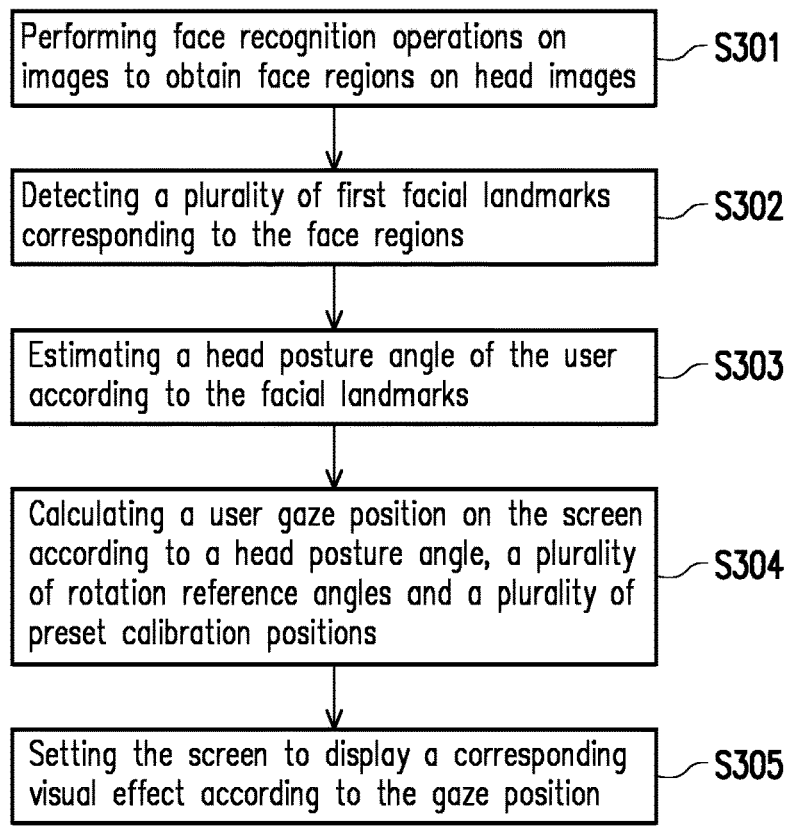
FIG. 3 is a flow chart of an operation method of an electronic device according to an embodiment of the disclosure.

To further illustrate how the electronic device 10 interacts with the user based on the image captured by the image capturing device 120, an example is provided below to describe the disclosure. FIG. 3 is a flow chart of an operation method of an electronic device according to an embodiment of the disclosure, and the process flow in FIG. 3 may be implemented with the components of the electronic device 10 in FIG. 1. Referring to FIG. 1 and FIG. 3, the detailed steps of the operation method of the electronic device of the embodiment are described below with reference to the components and devices of the electronic device 10 in FIG. 1.

In step S301, the face recognition module 131 performs a face recognition operation on the image captured by the image capturing device 120 to obtain a face region on the head image. Herein, the head image captured by the image capturing device 120 serves as a basis for predicting the gaze position on the screen 110 watched by the user. The face recognition module 131 may detect a face image from the head image captured by the image capturing device 120 to obtain a face region including a face image from the head image. Specifically, the face recognition module 131 may extract a plurality of personal facial features from the head image by using a specific feature extraction algorithm, such as a Haar-like feature, a Histogram of Oriented Gradient (HOG) feature or other suitable facial feature classification methods, and input the extracted facial features into a classifier for classification. The classifier may classify the extracted features of each image segmentation region according to a pre-trained data model, thereby detecting a face region conforming to the specific data model from the image.

In step S302, the landmark detecting module 132 detects a plurality of facial landmarks within the face region. Specifically, the landmark detecting module 132 may detect a plurality of facial landmarks for marking the facial contour, the shape of facial features, and the positions of facial features from the face region by using machine learning, deep learning, or other suitable algorithms. For example, the landmark detecting module 132 may utilize a constrained local model (CLM) algorithm, a constrained local neural fields (CLNF) algorithm, or an active shape model (ASM) algorithm to detect a plurality of facial landmarks from the face region.

In step S303, the head posture estimating module 133 estimates the head posture angle of the user based on the facial landmarks. In one embodiment, the head posture estimating module 133 may first map the facial landmarks at a plurality of two-dimensional position coordinate under a plane coordinate system to a plurality of three-dimensional position coordinates under a three-dimensional coordinate system. Specifically, the image capturing module 120 may map the two-dimensional coordinates in a camera coordinate system to the three-dimensional coordinates in a world coordinate system. Thereafter, the head posture estimating module 133 estimates the head posture angle of the user based on the three-dimensional position coordinates of the facial landmarks. For example, by using a perspective-n-point (PnP) algorithm, the head posture estimating module 133 may estimate the head posture angle of the user under the world coordinate system according to the coordinate positions of the facial landmarks. In addition, the head posture estimating module 133 may perform coordinate mapping on all or part of the facial landmarks to estimate the head posture angle of the user by using all or part of the facial landmarks.

In an embodiment, the head posture angle may include a head pitch angle that is rotated relative to a first coordinate axis and a head yaw angle that is rotated relative to a second coordinate axis. In another embodiment, the head posture angle may include a head pitch angle that is rotated relative to the first coordinate axis, a head yaw angle that is rotated relative to the second coordinate axis, and a head roll angle that is rotated relative to a third coordinate axis. For example, the head pitch angle may be used to represent an angle at which the user moves the head up and down on a virtual horizontal axis in a direction parallel to the screen 110; the head yaw angle may be used to represent an angle at which the user shakes head to the right and left on a virtual vertical axis in the direction parallel to the screen 110; and the head roll angle may be used to represent an angle at which the user rolls the head on a virtual longitudinal axis in a direction perpendicular to the screen 110.

In step S304, the gaze position predicting module 134 calculates the gaze position of the user on the screen 110 according to the head posture angle, the plurality of rotation reference angles, and the plurality of predetermined calibration positions. In one embodiment, the gaze position predicting module 134 may acquire a plurality of rotation reference angles corresponding to a plurality of predetermined calibration positions on the screen 110. These rotation reference angles represent the head posture angles presented by the user's head when the user gazes the predetermined calibration position on the screen 110, and serve as reference comparison information for subsequently predicting the position of the user's line of sight. However, the disclosure provides no limitation to the number of predetermined calibration positions and the actual coordinate position on the screen 110, but the number of the predetermined calibration position is at least two. With at least two predetermined calibration positions and corresponding rotation reference angles, the gaze position predicting module 134 can establish a corresponding relationship between the head pitch angle and the high/low offset level of the gaze position, and establish a corresponding relationship between the head yaw angle and left/right offset level of the gaze position. In an embodiment, the predetermined calibration positions may be located on four corners or four edges of the screen 110, respectively. In another embodiment, the predetermined calibration positions may be respectively located on the diagonal of the screen 110. Then, according to the correspondence relationship between the rotation reference angle, the predetermined diagonal position, and the rotation reference angle and the predetermined diagonal position, the gaze position predicting module 134 may convert the head posture angle estimated in real time into the gaze position on the screen 110 where the user's sight is projected. This gaze position may be represented by a screen coordinate system defined based on the size and resolution of the screen 110, and thus may include a first coordinate value in a first axial direction and a second coordinate value in a second axial direction (e.g., coordinate values on X and Y axes). In addition, other than converting the head posture angle to the gaze position based on the rotation reference angle and the predetermined calibration position, in another embodiment, the gaze position predicting module 134 may also use the user's head rotation angle to search for a lookup table that is established in advance to obtain the gaze position of the user.

Therefore, after acquiring the gaze position of the user, in step S305, the interactive application module 135 configures the screen 110 to display the corresponding visual effect according to the gaze position to control the screen 110 to display the corresponding image frame. In an embodiment, the interactive application module 135 may control the screen 110 to display an indicator object at the gaze position, and the indicator object may be an arrow or a geometric pattern (such as a dot) and so on. Accordingly, the indicator object also moves on the screen 110 in response to a change in the gaze position that is predicted in real time. In other words, the user may control the movement of the indicator object on the screen 110 by the line of sight thereof, so that the user can further perform more diverse interactive control according to the gaze position of the indicator object.

In another embodiment, the interactive application module 135 may also control the screen 110 to display the information prompt region associated with a display object according to the display object indicated by the gaze position. The display object may be any icon or text display object on a user interface displayed by the screen 110. Further, when the gaze position overlaps the area covered by the display object, the interactive application module 135 may display the information prompt region of the display object to provide other detailed information related to the display object. For example, when the user's gaze position overlaps a system time region of an operation system toolbar, the interactive application module 135 may be expanded and provide a window that displays more detailed calendar and time information as feedback. In addition, in an embodiment, the interactive application module 135 may also control the screen 110 to change the display effect for displaying the display region according to the display region in which the gaze position is located. Herein, the prompt display effect may include a display color, a display font or a display size, and the like. Specifically, the entire display area of the screen 110 may be divided into a plurality of display regions. When the gaze position of the user is located in one of the display regions, the interactive application module 135 may change the display effect of the display area where the gaze position is located, such as enlarging the display content in the display area and the like.

In one embodiment, the rotation reference angle for predicting the gaze position of the user may be obtained through prior testing conducted by product designer. In this case, the rotation reference angle may be a fixed predetermined value recorded in the storage device 130. In another embodiment, the rotation reference angle used to predict the gaze position of the user may be established according to the user's actual habits in using. Different users have different physical habits and biological features. In another embodiment, the rotation reference angle may be obtained through a calibration process performed by the actual user, thereby improving the accuracy of predicting the gaze position.

The embodiment is exemplified below to explain how the rotation reference angle corresponding to the plurality of predetermined calibration positions is obtained by the calibration process, and it is further described in details how the gaze position is predicted based on the head posture angle according to the rotation reference angle.

Figure 4:
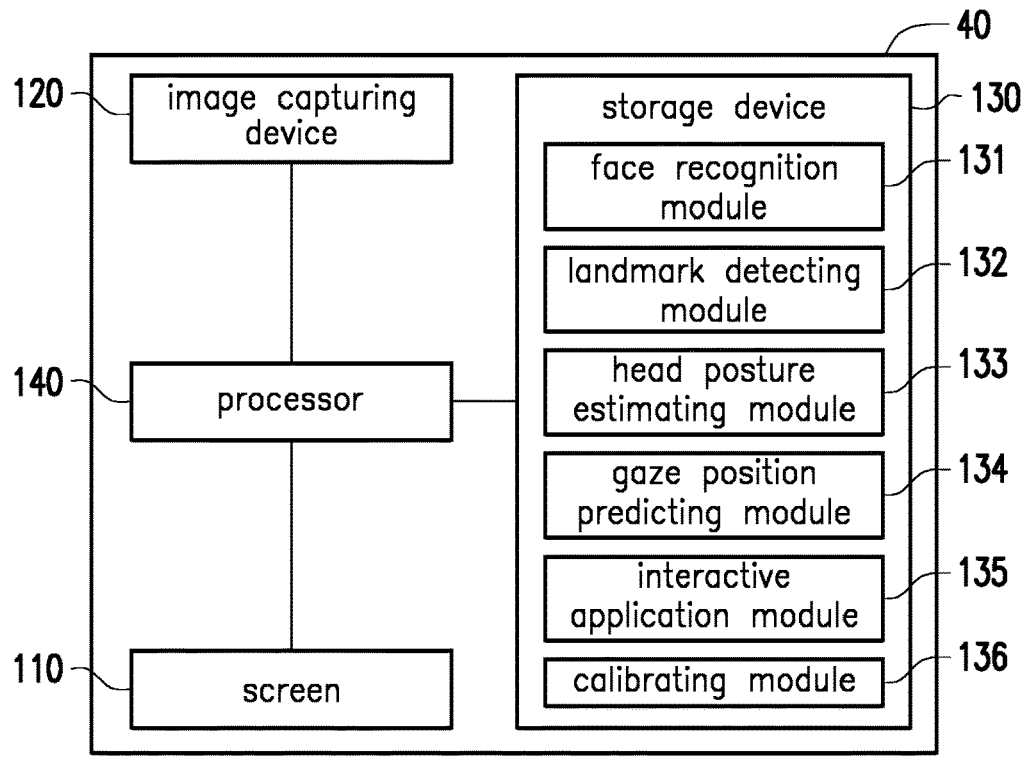
FIG. 4 is a block diagram of an electronic device according to an embodiment of the disclosure.

FIG. 4 is a block diagram of an electronic device according to an embodiment of the disclosure. Referring to FIG. 4, an electronic device 40 of the embodiment includes a screen 110, an image capturing device 120, a storage device 130, and a processor 140. The coupling relationship and functions thereof are similar to those described in the foregoing embodiment, and are not repeated herein. Different from the foregoing embodiment, the storage device 130 of the embodiment further records a calibration module 136, and the processor 140 may load and execute the calibration module 136 to obtain a corresponding rotation reference angle for a specific actual user.

In the embodiment, the calibration module 136 may control the screen 110 to display a plurality of marker objects on the plurality of predetermined calibration positions on the screen 110. The predetermined calibration positions can be respectively located on the upper edge, the lower edge, the left edge and the right edge of the screen 110. Referring to FIG. 5A, FIG. 5A is a schematic diagram showing an example of displaying a plurality of marker objects according to an embodiment of the disclosure. The calibration module 136 may control the screen 110 to display a marker object obj1 on the upper edge of the screen 110; display a marker object obj2 on the right edge of the screen 110; display a marker object obj3 on the lower edge of the screen 110; and display the marker object obj4 on the left edge of the screen 110. However, FIG. 5A only serves as an example and is not intended to limit the scope of the disclosure.

Based on the example of FIG. 5A, the calibration module 136 may prompt the user to view the marker objects obj1 to obj4, and at the same time, the image capturing device 120 may capture a plurality of head images when the user looks at the marker objects obj1 to obj4. Specifically, the calibration module 136 may prompt the user to view the marker object obj1 first, and drives the image capturing device 120 to capture the head image when the user looks at the marker object obj1, and so on, and obtain the head images corresponding to obj2 to obj4 in the subsequent process. After acquiring the head images of the user viewing the marker objects obj1 to obj4, the calibration module 136 may analyze the head images to estimate the rotation reference angles respectively corresponding to the predetermined calibration positions P1 to P4. Specifically, the calibration module 136 may use the operations and algorithms performed by the face recognition module 131, the landmark detecting module 132 and the head posture estimating module 133 to estimate the rotation reference angles corresponding to the predetermined calibration positions P1 to P4 according to the head images captured during the operation of the calibration process. The calibration module 136 may record the rotation reference angles corresponding to the predetermined calibration positions P1 to P4 into the storage device 130.

Based on the example of FIG. 5A, the rotation reference angle recorded by the calibration module 136 may include a first pitch angle corresponding to the predetermined calibration position P1, a second pitch angle corresponding to the predetermined calibration position P3, a first yaw angle corresponding to the predetermined calibration position P2 and a second yaw angle corresponding to the predetermined calibration position P4. Specifically, based on the example of FIG. 5A, since the predetermined calibration positions P1 to P4 are respectively located at the upper edge, the lower edge, the left edge, and the right edge of the screen 110, the rotation reference angle acquired by the calibration module 136 may include the maximum pitch angle, the minimum pitch angle, the maximum yaw angle, and the minimum yaw angle corresponding to the four predetermined calibration positions P1 to P4.

For details, please refer to FIG. 5B. FIG. 5B is a schematic diagrams showing a situation where a user views the marker object according to the example of FIG. 5A. When the user views the marker object obj1, the head of the user 50 moves upward, and the calibration module 136 can estimate the maximum pitch angle $\theta_{pmax}$ corresponding to the predetermined calibration position P1 according to the head image captured at this time. Similarly, please refer to FIG. 5C. FIG. 5C is a schematic diagrams showing a situation where a user views the marker object according to the example of FIG. 5A. When the user views the marker object obj3, the head of the user 50 moves downward, and the calibration module 136 may estimate the minimum pitch angle $\theta_{pmin}$ corresponding to the predetermined calibration position P3 according to the head image Img3 captured at this time. Similarly, the calibration module 136 may also obtain the maximum yaw angle $\theta_{ymax}$ and the minimum yaw angle $\theta_{ymin}$ corresponding to the predetermined calibration positions P2 and P4. Here, the calibration module 136 may record the maximum pitch angle $\theta_{pmax}$, the minimum pitch angle $\theta_{man}$, the maximum yaw angle $\theta_{ymax}$, and the minimum yaw angle $\theta_{ymin}$ as the rotation reference angle. Here, the maximum pitch angle $\theta_{pmax}$, the minimum pitch angle $\theta_{pmin}$, the maximum yaw angle $\theta_{ymax}$, and the minimum yaw angle $\theta_{ymin}$ may define a range of possible angles at which the user moves the head when the user views the screen 110.

In addition, it should be indicated that FIG. 5A is an example in which the predetermined calibration positions are respectively located on the upper, lower, left and right edges of the screen 110, so that the calibration module 136 can obtain the maximum pitch angle $\theta_{pmax}$, the minimum pitch angle $\theta_{pmin}$, the maximum yaw angle $\theta_{ymax}$, and the minimum yaw angle $\theta_{ymin}$. However, in other embodiments, even if the predetermined calibration position is not located at the upper, lower, left and right edges of the screen 110, the calibration module 136 may still acquire two pitch angles (i.e., the first pitch angle and the second pitch angle) and two yaw angles (i.e., the first yaw angle and the second yaw angle) as the rotation reference angle and the corresponding predetermined calibration positions, thereby establishing a correspondence relationship between the head pitch angle and high/low offset level of the gaze position and the corresponding relationship between the head yaw angle and the left/right offset level of the gaze position.

In an embodiment, the gaze position predicting module 134 may perform interpolation operation or extrapolation operation according to the first yaw angle, the second yaw angle, the corresponding first position corresponding to the first yaw angle in the predetermined calibration position, the corresponding second position corresponding to the second yaw angle in the predetermined calibration position and the head yaw angle, thereby obtaining a first coordinate value of the gaze position. Meanwhile, the gaze position predicting module 134 may perform interpolation operation or extrapolation operation according to the first pitch angle, the second pitch angle, the corresponding third position corresponding to the first pitch angle in the predetermined calibration position, the corresponding third position corresponding to the second pitch angle in the predetermined calibration position and the head pitch angle, thereby obtaining a second coordinate value of the gaze position.

Figures 6A, 6B:
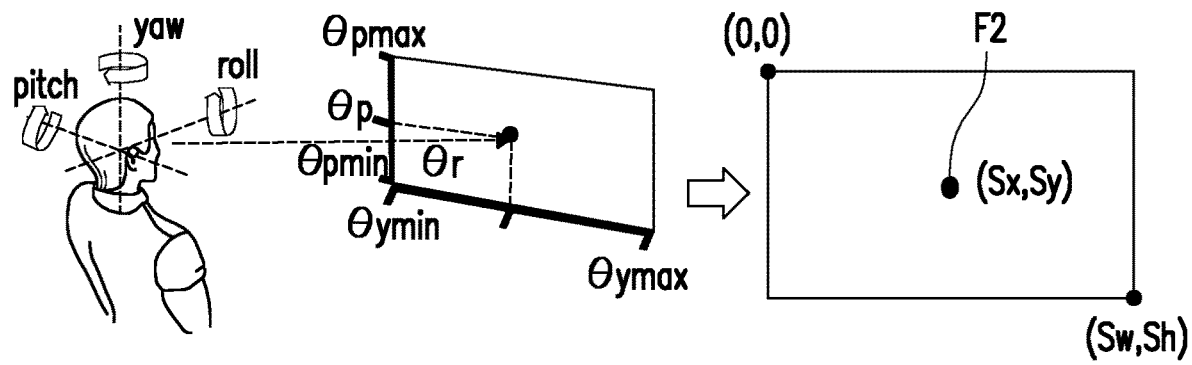
FIG. 6A is a schematic view showing the user looking at a screen.
FIG. 6B is a schematic view showing the position where the user gazes in FIG. 6A corresponding to the image frame displayed on the screen.

Specifically, the rotation reference angle generated based on FIG. 5A is taken as an example for description. FIG. 6A is a schematic view showing the user looking at a screen, and FIG. 6B is a schematic view showing the position where the user gazes in FIG. 6A corresponding to the image frame displayed on the screen. Referring to FIG. 6A and FIG. 6B, the gaze position predicting module 134 may perform interpolation operation according to the X-axis coordinate (i.e., SW) of the predetermined calibration position under the screen coordinate system corresponding to the maximum yaw angle $\theta_{ymax}$, the minimum yaw angle and the maximum yaw angle $\theta_{ymax}$ as well as the X-axis coordinate (i.e., 0) of the present calibration position under the screen coordinate system corresponding to the minimum yaw angle $\theta_{ymin}$, and the user's current head yaw angle $\theta_y$, thereby obtaining the X coordinate value (i.e., Sx) of the gaze position F2. Similarly, the gaze position predicting module 134 may perform interpolation operation according to the Y-axis coordinate (i.e., 0) of the predetermined calibration position under the screen coordinate system corresponding to the maximum pitch angle $\theta_{pmax}$, the minimum pitch angle $\theta_{pmin}$, and the maximum pitch angle $\theta_{pmax}$ as well as the X-axis coordinate (i.e., Sh) of the present calibration position under the screen coordinate system corresponding to the minimum pitch angle $\theta_{pmin}$, and the user's current head pitch angle $\theta_p$, thereby obtaining the Y coordinate value (i.e., Sy) of the gaze position F2. In this manner, the gaze position predicting module 134 may predict that the user's gaze position is (Sx, Sy) under the screen coordinate system. Here, the screen coordinate system may be a coordinate system defined in units of pixels and based on screen resolution. In one embodiment, the gaze position predicting module 134 may calculate the coordinates of the gaze position according to the following equation (1) and equation (2).

$$Sx = Sw \times \left[ \frac{\theta_y}{\theta_{ymax} - \theta_{ymin}} \times 100\% \right] \quad \text{equation (1)}$$

$$Sy = Sh \times \left[ \frac{\theta_p}{\theta_{pmax} - \theta_{pmin}} \times 100\% \right] \quad \text{equation (2)}$$

In the foregoing embodiment, the prediction of the gaze position does not take into consideration the distance between the user and the screen 110. However, the distance between the user and the screen 110 affects the degree of the head movement when the user views the screen 110. In general, the closer a user is to the screen 110, the greater the degree of the head movement of the user viewing the edge of the screen 110. On the contrary, if the user is farther from the screen 110, the smaller the degree of head movement of the user viewing the edge of the screen 110. It can be known that either the predetermined rotation reference angle or the rotation reference angle generated according to the calibration process is both generated based on a predetermined specific distance, and therefore the actual viewing distance between the user and the screen 110 may affect the prediction result of gaze position.

Figure 7:
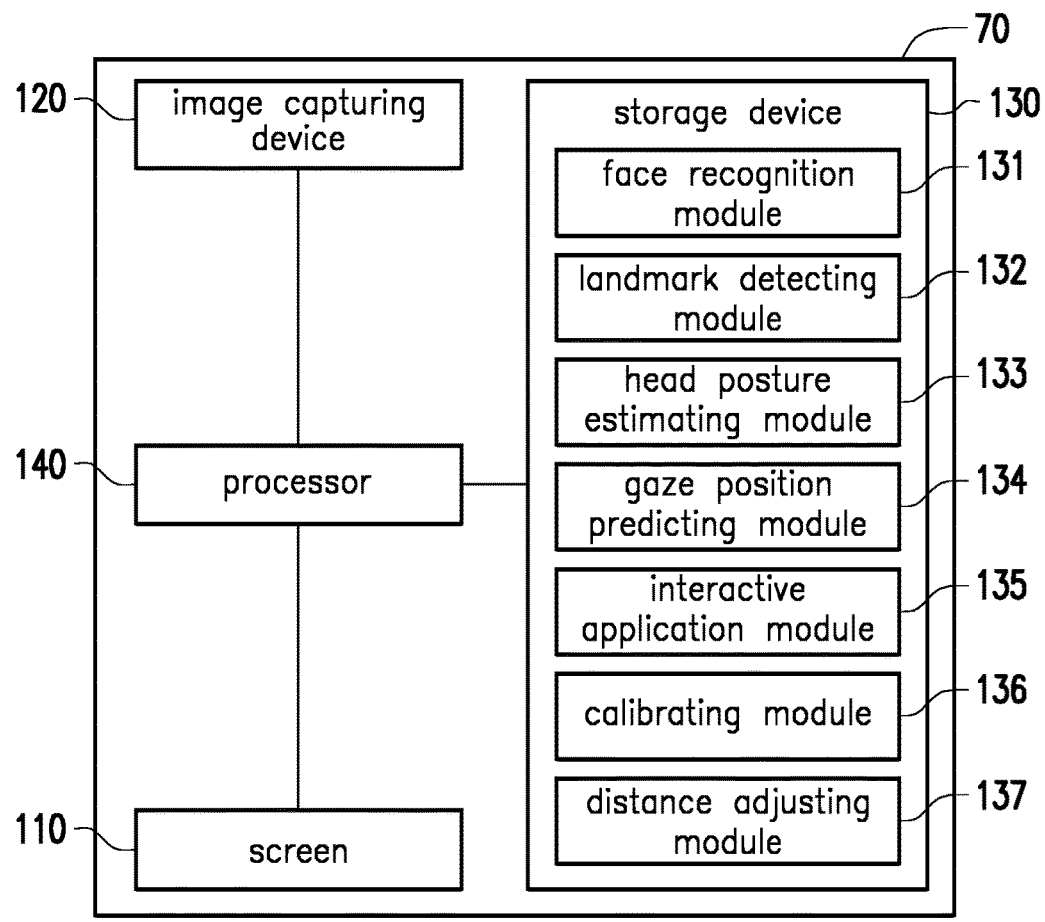
FIG. 7 is a block diagram of an electronic device according to an embodiment of the disclosure.

FIG. 7 is a block diagram of an electronic device according to an embodiment of the disclosure. Referring to FIG. 7, an electronic device 70 of the embodiment includes a screen 110, an image capturing device 120, a storage device 130, and a processor 140. The coupling relationship and the function thereof are similar to those described in the foregoing embodiment, and are not repeated herein. Different from the foregoing embodiment, the storage device 130 of the embodiment further records a distance adjusting module 137, and the processor 140 may load and execute the distance adjusting module 137 to adjust the prediction result of the gaze position based on the actual viewing distance between the user and the screen 110, thereby improving the accuracy of predicting the gaze position.

In the embodiment, the distance adjusting module 137 may calculate the viewing distance between the user and the screen 110. The distance adjusting module 137 may also estimate the viewing distance between the user and the screen 110 based on the head image captured by the image capturing device 120, for example, the viewing distance between the user and the screen 110 is estimated according to the size of the face region. The distance adjusting module 137 may also calculate the viewing distance between the user and the screen 110 according to the facial landmarks within the face region. Then, the distance adjusting module 137 may adjust the previously recorded rotation reference angle according to the viewing distance, so that the gaze position predicting module 134 can convert the head posture angle into the gaze position according to the adjusted rotation reference angle. Alternatively, the distance adjusting module 137 may adjust the gaze position generated by the gaze position predicting module 134 according to the viewing distance.

In an embodiment, the distance adjusting module 137 may calculate a plurality of first viewing distances between the user and the screen 110 according to the facial landmarks when the calibration process is performed. In addition, the distance adjusting module 137 may estimate a second viewing distance between the user and the screen 110 according to the facial landmarks when the user actually operates the electronic device 70. Thereafter, the distance adjusting module 137 may adjust the rotation reference angle or the gaze position according to the second viewing distance and/or the plurality of first viewing distances.

Figure 8A:
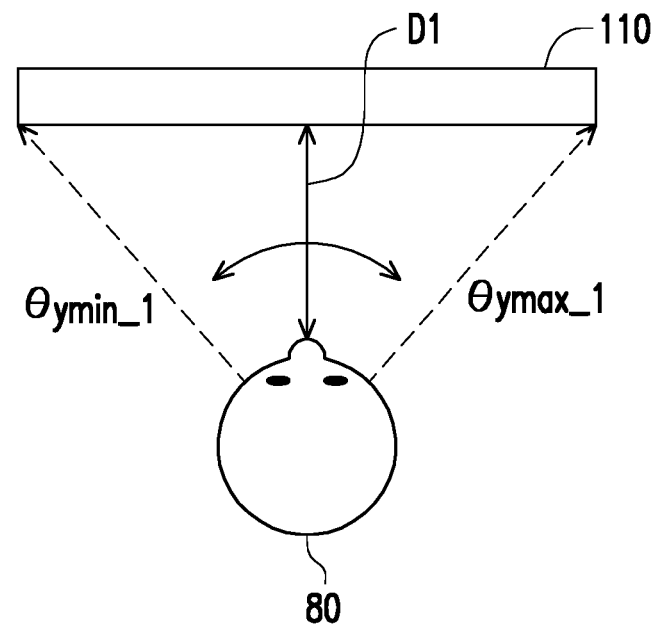
FIG. 8A and FIG. 8B are schematic diagrams showing an example of establishing a rotation reference angle based on a different predetermined distance according to an embodiment of the disclosure.
Figure 8B:
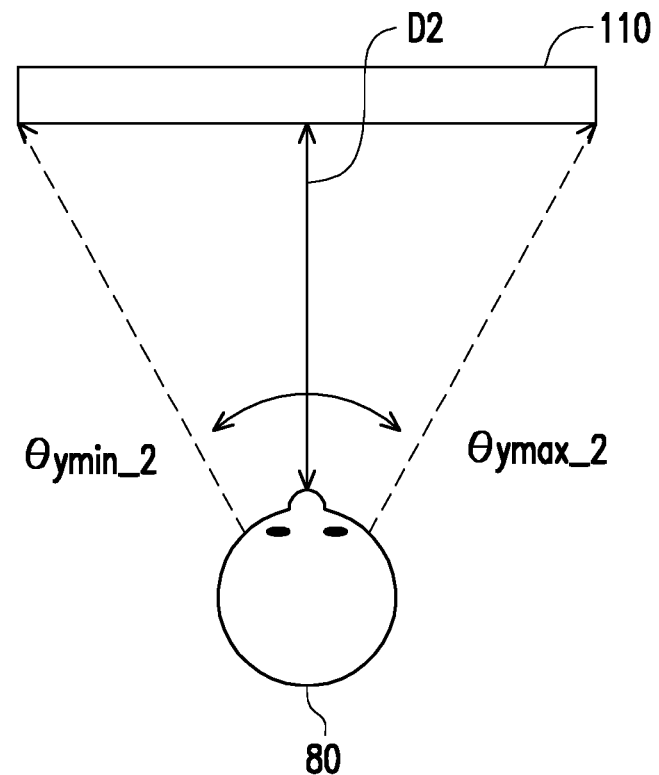

Specifically, in order for the distance adjusting module 137 to adjust the rotation reference angle or the gaze position according to the viewing distance, it is required to create two sets of rotation reference angles corresponding to at least two different predetermined viewing distances (i.e., a plurality of first viewing distances) in advance. FIG. 8A and FIG. 8B are schematic diagrams showing an example of obtaining a rotation reference angle based on a different predetermined distance according to an embodiment of the disclosure. Referring to FIG. 8A and FIG. 8B, when the calibration process described in the foregoing embodiment is to be used to obtain the rotation reference angle, the calibration module 136 may prompt the user 80 to repeat the calibration process at a position different from the predetermined distance from the screen 110. In this manner, the calibration module 136 may obtain a first set of rotation reference angle (for example, the first yaw angle $\theta_{ymax\_1}$ and the second yaw angle $\theta_{ymin\_1}$ shown in FIG. 8A) first with respect to the first predetermined distance D1, and then obtain a second set of rotation reference angles (for example, the first yaw angle $\theta_{ymax\_2}$ and the second yaw angle $\theta_{ymin\_2}$ shown in FIG. 8A) with respect to a second predetermined distance D2. However, the details of obtaining the rotation reference angle based on the head image are described in the foregoing embodiments, and details are not repeated herein. Table 1 is an example of two sets of rotation reference angles established with respect to different predetermined distances, but is not intended to limit the scope of the disclosure.

TABLE 1

|  | First pitch angle | Second pitch angle | First yaw angle | Second yaw angle |
| --- | --- | --- | --- | --- |
| First predetermined distance D1 | $\theta_{pmax\_1}$ | $\theta_{pmin\_1}$ | $\theta_{ymax\_1}$ | $\theta_{ymin\_1}$ |
| Second predetermined distance D2 | $\theta_{pmax\_2}$ | $\theta_{pmin\_2}$ | $\theta_{ymax\_2}$ | $\theta_{ymin\_2}$ |

In other words, the storage device 130 stores at least two sets of rotation reference angles corresponding to different predetermined distances. Therefore, if Table 1 is taken as an example, the distance adjusting module 137 may obtain the viewing distance (i.e., the second viewing distance) between the user and the screen 110 after the calibration process is performed, and then perform interpolation operation or extrapolation operation according to the first predetermined distance D1, the second predetermined distance D2, the viewing distance and the two sets of rotation reference angles (as shown in Table 1) corresponding to the first predetermined distance D1, the second predetermined distance D2, thereby obtaining the adjusted rotation reference angle. In this manner, the gaze position predicting module 134 may predict the gaze position on the screen 110 where the user's line of sight is laid based on the adjusted rotation reference angle and based on the head posture angle estimated in real time.

Alternatively, the gaze position predicting module 134 may first calculate a first gaze position $(Sx_1, Sy_1)$ according to the first set of rotation reference angle corresponding to the first predetermined distance D1, and then calculate a second gaze position $(Sx_2, Sy_2)$ according to the second set of rotation reference angle corresponding to the second predetermined distance D2. Then, the distance adjusting module 137 may after obtaining the viewing distance perform the interpolation operation or extrapolation operation according to the first predetermined distance D1, the second predetermined distance D2, the viewing distance, and the first gaze position $(Sx_1, Sy_1)$ and the second gaze position $(Sx_2, Sy_2)$, thereby obtaining the adjusted gaze position $(Sx_f, Sy_f)$.

When the user's head roll angle changes, it is likely that the gaze position of the user is also changed. In another embodiment, the calibration module 136 may also perform a calibration operation with respect to the head roll angle, and the gaze position predicting module 134 may also adjust the corresponding gaze position on the screen 110 with respect to the change of the head roll angle.

In the above embodiment, the electronic device 10 is described as a notebook computer or the like. In other embodiments, the various components of the electronic device 10 may be modified as appropriate depending on various design considerations. In another embodiment, when the user wears VR glasses, surgical loupes, a head mounted display, or other wearable device on the head, the user's head image and part of the facial landmarks are covered by the wearable device. The processor 140 may estimate the user's sight according to the facial landmarks that are not covered by the wearable device. In another embodiment, the user wears VR glasses, surgical loupes, a head-mounted display, or other wearable device on the head, and the user's head image and part of the facial landmarks are covered by the wearable device. Meanwhile, the wearable devices are provided with one or more simulated landmarks, and the processor 140 may use the facial landmarks not covered by the wearable device and the simulated landmarks on the wearable device to estimate the user's line of sight. In addition, in some virtual reality applications, the user wears VR glasses with a screen on the head, and the user's head moves more dramatically in order to experience the virtual reality effect around the user. With the above embodiment together with the use of one or more image capturing devices, even if the user's eyes are covered, it is still possible to estimate the position on the screen of the VR glasses where the user gazes, thereby correspondingly generating the desired image effect on the screen.

In summary, in the embodiment of the disclosure, the electronic device is capable of capturing head image by using general photographing equipment and perform analysis, and accurately infer the position where the user's sight is projected on the screen without analyzing the pupil position according to the eye image, such that the user can interact with the electronic device in a more intuitive and easy way. That is, the disclosure may combine the existing consumer electronic products with a general camera lens with the proposed operation method, thereby achieving the goal of controlling electronic device according to the user's gaze on the screen, and enhancing the application range of the disclosure in practical applications. In addition, since the electronic device can obtain the rotation reference angle used as a reference for comparing the rotation angle of the head with respect to individual user, and further adjust the prediction result of the gaze position according to the actual viewing distance between the user and the screen, it is possible to greatly improve the accuracy of predicting the gaze position on the screen based on the facial image.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. An electronic device, configured to make a screen to display a plurality of image frames, comprising:
    an image capturing device;
    a storage device, storing a plurality of modules; and
    a processor, coupled to the image capturing device and the storage device, configured to execute the modules in the storage device to:
    configure the screen to display a plurality of marker objects at a plurality of predetermined calibration positions;
    configure the image capturing device to capture a plurality of first head images when a user is looking at the predetermined calibration positions;
    perform a plurality of first face recognition operations on the first head images to obtain a plurality of first face regions corresponding to the predetermined calibration positions;
    detect a plurality of first facial landmarks corresponding to the first face regions;
    calculate a plurality of rotation reference angles of the user looking at the predetermined calibration positions according to the first facial landmarks;
    configure the image capturing device to capture a second head image of the user;
    perform a second face recognition operation on the second head image to obtain a second face region;
    detect a plurality of second facial landmarks within the second face region;
    estimate a head posture angle of the user according to the second facial landmarks;
    calculate a gaze position of the user on the screen according to the head posture angle, the rotation reference angles, and the predetermined calibration positions; and
    configure the screen to display a corresponding visual effect according to the gaze position.

2. The electronic device according to claim 1, wherein the gaze position comprises a first coordinate value in a first axial direction and a second coordinate value in a second axial direction.

3. The electronic device according to claim 2, wherein the head posture angles comprise a head pitch angle and a head yaw angle, and the rotation reference angles comprise a first pitch angle, a second pitch angle, a first yaw angle, and a second yaw angle corresponding to the predetermined calibration positions.

4. The electronic device according to claim 3, wherein the processor performs interpolation operation or extrapolation operation according to the first yaw angle, the second yaw angle, a first position corresponding to the first yaw angle among the predetermined calibration positions, a second position corresponding to the second yaw angle among the predetermined calibration positions and the head yaw angle, thereby obtaining the first coordinate value of the gaze position; and
    the processor performs interpolation operation or extrapolation operation according to the first pitch angle, the second pitch angle, a third position corresponding to the first pitch angle among the predetermined calibration positions, a fourth position corresponding to the second pitch angle among the predetermined calibration positions and the head pitch angle, thereby obtaining the second coordinate value of the gaze position.

5. The electronic device according to claim 1, wherein the processor calculates a plurality of first viewing distances between the user and the screen according to the first facial landmarks;
    The processor estimates a second viewing distance between the user and the screen according to the second facial landmarks; and
    the processor adjusts the rotation reference angles or the gaze position according to the second viewing distance and the first viewing distances.

6. The electronic device according to claim 1, wherein the processor maps a plurality of two-dimensional position coordinates of the second facial landmarks under a plane coordinate system to a plurality of three-dimensional position coordinates under a three-dimensional coordinate system; and
    the processor estimates the head posture angle according to the three-dimensional position coordinates of the second facial landmarks.

7. The electronic device according to claim 1, wherein the second head image comprises a wearable device, and the second facial landmarks do not comprise a plurality of third facial landmarks of the user covered by the wearable device.

8. The electronic device according to claim 1, wherein the second head image comprises a wearable device, and the second facial landmarks comprise one or more simulated landmarks marked by the wearable device.

9. An operating method, adapted for an electronic device comprising an image capturing device and making a screen to display a plurality of image frames, the method comprising:
    configuring the screen to display a plurality of marker objects at a plurality of predetermined calibration positions;
    configuring the image capturing device to capture a plurality of first head images when a user is looking at the predetermined calibration positions;

performing a plurality of first face recognition operations on the first head images to obtain a plurality of first face regions corresponding to the predetermined calibration positions;

detecting a plurality of first facial landmarks corresponding to the first face regions;

calculating a plurality of rotation reference angles of the user looking at the predetermined calibration positions according to the first facial landmarks;

configuring the image capturing device to capture a second head image of the user;

performing a second face recognition operation on the second head image to obtain a second face region;

detecting a plurality of second facial landmarks within the second face region;

estimating a head posture angle of the user according to the second facial landmarks;

calculating a gaze position of the user on the screen according to the head posture angle, the rotation reference angles, and the predetermined calibration positions; and configuring the screen to display a corresponding visual effect according to the gaze position.

10. The operation method according to claim 9, wherein the gaze position comprises a first coordinate value in a first axial direction and a second coordinate value in a second axial direction.

11. The operation method according to claim 10, wherein the head posture angles comprise a head pitch angle and a head yaw angle, and the rotation reference angles comprise a first pitch angle, a second pitch angle, a first yaw angle, and a second yaw angle corresponding to the predetermined calibration positions.

12. The operation method according to claim 11, wherein the step of calculating the gaze position of the user on the screen according to the head posture angle, the rotation reference angles and the predetermined calibration positions comprises:

performing interpolation operation or extrapolation operation according to the first yaw angle, the second yaw angle, a first position corresponding to the first yaw angle among the predetermined calibration positions, a second position corresponding to the second yaw angle among the predetermined calibration positions and the head yaw angle, thereby obtaining the first coordinate value of the gaze position; and performing interpolation operation or extrapolation operation according to the first pitch angle, the second pitch angle, a third position corresponding to the first pitch angle among the predetermined calibration positions, a fourth position corresponding to the second pitch angle among the predetermined calibration positions and the head pitch angle, thereby obtaining the second coordinate value of the gaze position.

13. The operation method according to claim 9, wherein the method further comprises:

calculating a plurality of first viewing distances between the user and the screen according to the first facial landmarks;

estimating a second viewing distance between the user and the screen according to the second facial landmarks; and adjusting the rotation reference angles or the gaze position according to the second viewing distance and the first viewing distances.

14. The operation method according to claim 9, wherein the method further comprises:

mapping a plurality of two-dimensional position coordinates of the second facial landmarks under a plane coordinate system to a plurality of three-dimensional position coordinates under a three-dimensional coordinate system; and estimating the head posture angle according to the three-dimensional position coordinates of the second facial landmarks.

15. The operation method according to claim 9, wherein the second head image comprises a wearable device, and the second facial landmarks do not comprise a plurality of third facial landmarks of the user covered by the wearable device.

16. The operation method according to claim 9, wherein the second head image comprises a wearable device, and the second facial landmarks comprise one or more simulated landmarks marked by the wearable device.

* * * * *